US007450785B2

(12) United States Patent
Haas et al.

(10) Patent No.: US 7,450,785 B2
(45) Date of Patent: Nov. 11, 2008

(54) METHOD AND DEVICE FOR SORTING SIMILAR IMAGES

(75) Inventors: William R. Haas, Fort Collins, CO (US); Kirk S. Tecu, Greeley, CO (US); David W. Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 10/349,691

(22) Filed: Jan. 22, 2003

(65) Prior Publication Data

US 2004/0141658 A1 Jul. 22, 2004

(51) Int. Cl.
*G06K 9/60* (2006.01)
(52) U.S. Cl. .................. 382/305; 382/219; 382/278; 382/282
(58) Field of Classification Search .......... 382/218, 382/219, 278, 282, 284, 294, 274, 275, 190, 382/164; 358/537, 452, 540, 450, 538, 453; 345/619, 431
See application file for complete search history.

(56) References Cited

U.S. PATENT DOCUMENTS

| | | | | |
|---|---|---|---|---|
| 5,602,584 A | * | 2/1997 | Mitsutake et al. | 348/47 |
| 5,781,174 A | * | 7/1998 | Uya et al. | 345/639 |
| 5,842,194 A | * | 11/1998 | Arbuckle | 706/52 |
| 5,848,185 A | * | 12/1998 | Koga et al. | 382/173 |
| 5,995,649 A | * | 11/1999 | Marugame | 382/154 |
| 6,075,905 A | * | 6/2000 | Herman et al. | 382/284 |
| 6,128,416 A | * | 10/2000 | Oura | 382/284 |
| 6,231,185 B1 | * | 5/2001 | Pipa | 351/208 |
| 6,307,393 B1 | * | 10/2001 | Shimura | 324/765 |
| 6,307,961 B1 | * | 10/2001 | Balonon-Rosen et al. | 382/167 |
| 6,351,545 B1 | * | 2/2002 | Edelson et al. | 382/107 |
| 6,360,006 B1 | * | 3/2002 | Wang | 382/162 |
| 6,516,087 B1 | * | 2/2003 | Camus | 382/154 |
| 6,535,648 B1 | * | 3/2003 | Acharya | 382/274 |
| 6,583,634 B1 | * | 6/2003 | Nozoe et al. | 324/751 |
| 6,625,308 B1 | * | 9/2003 | Acharya et al. | 382/168 |
| 6,661,470 B1 | * | 12/2003 | Kawakami et al. | 348/699 |
| 6,683,643 B1 | * | 1/2004 | Takayama et al. | 348/247 |
| 6,757,428 B1 | * | 6/2004 | Lin et al. | 382/165 |
| 6,865,290 B2 | * | 3/2005 | Kohchi | 382/165 |
| 6,963,425 B1 | * | 11/2005 | Nair et al. | 358/1.9 |

\* cited by examiner

*Primary Examiner*—Yosef Kassa

(57) ABSTRACT

A method of comparing images is disclosed herein. The images may be represented by image data comprising a plurality of image data values. An embodiment of the method may comprise determining at least one image data value representative of at least one first portion of a first image. The method may further comprise determining at least one second image data value representative of at least one first portion of a second image. The at least one first portion of the first image and the at least one first portion of the second image are located in substantially similar regions of the first image and the second image. The at least one first image data value is compared to the at least one second image data value. The first image is similar to the second image if the at least one first image data value is within a preselected amount of the at least one second image data value.

31 Claims, 5 Drawing Sheets

METHOD AND DEVICE FOR SORTING SIMILAR IMAGES

BACKGROUND

A photographer may be required to take many pictures of an object or a scene in order to obtain a desired photograph. The plurality of pictures enables the photographer to photograph the object or scene from different angles and using different conditions, such as different light conditions. In film-type cameras, taking several pictures of a single scene or object in order to obtain a desired photograph is time consuming and expensive due to developing costs and the expense of the film.

Digital cameras, on the other hand, generate image data representative of images and have the ability to store the image data on storage devices, such as removable electronic memory devices. After image data representative of several images has been generated, the storage device may be connected to a computer or the like, which processes the image data and displays replicated images based on the image data. Data storage devices are typically capable of storing image data representative of a plurality of images and are continually being improved to store more images.

The ability to store image data representative of a large number of images enables a user to generate image data representative of several images of similar scenes or objects and store the image data on a single data storage device. However, sorting the images into groups of similar images with so many images is very time consuming and can be very complicated. For example, a video display that replicates the images is only able to display a limited number of detailed images. Therefore, a user may have to print all the images stored on the storage device, in order to sort the images into groups of similar images. Printing all the images is typically very time consuming as is manually sorting through all the images. Printing the images may also be very costly due to paper and ink costs.

In addition to printing the images, labels or the like must be assigned to each image in order to identify them. The user may enter labels for all the images, which adds more time to the process of sorting the images. On the other hand, the digital camera or the computer may assign labels to the images. The assigned labels, however, are typically confusing because they are simply random or sequential numbers or letters assigned to the images and have no bearing on the subject of the images. Therefore, the user is typically not able to readily recall that a specific label is assigned to a specific image.

As described above, many problems in sorting images into groups of similar images exist.

SUMMARY

A method of comparing images is disclosed herein. The images may be represented by image data comprising a plurality of image data values. An embodiment of the method may comprise determining at least one image data value representative of at least one first portion of a first image. The method may further comprise determining at least one second image data value representative of at least one first portion of a second image. The at least one first portion of the first image and the at least one first portion of the second image are located in substantially similar regions of the first image and the second image. The at least one first image data value is compared to the at least one second image data value. The first image is similar to the second image if the at least one first image data value is within a preselected amount of the at least one second image data value.

DETAILED DESCRIPTION

Methods and devices for sorting similar images are disclosed herein. The images are representative of image data and are displayable on a viewing device, such as a video monitor. The image data may be generated by an imaging device such as a scanner or a digital camera. In summary, the method and devices described herein may use a computer or the like to analyze the image data and sort the respective images into similar groups. A user may then select images from the groups which are to be retained. Image data representative of images not selected to be retained may be deleted. The methods and devices described herein enable a user of the imaging device to capture several images of the same object and to select which images are to be retained without the need of manually sorting the images.

Having summarily described an embodiment of the methods and devices for sorting images, some embodiments of the methods and devices will now be described in greater detail. An embodiment of the devices for sorting images described herein may include a computer, not shown, that analyzes image data. The image data includes data that is able to be processed so as to be representative of an image. The methods described herein may be accomplished by using a computer program or the like that runs on the computer. The computer program may be code or instructions for the computer and may reside on a memory device, such as optical, magnetic, or electronic memory, operatively associated with the computer. The computer program may analyze the image data to sort similar images and display them in proximity to one another as described in greater detail below.

Figure 1:
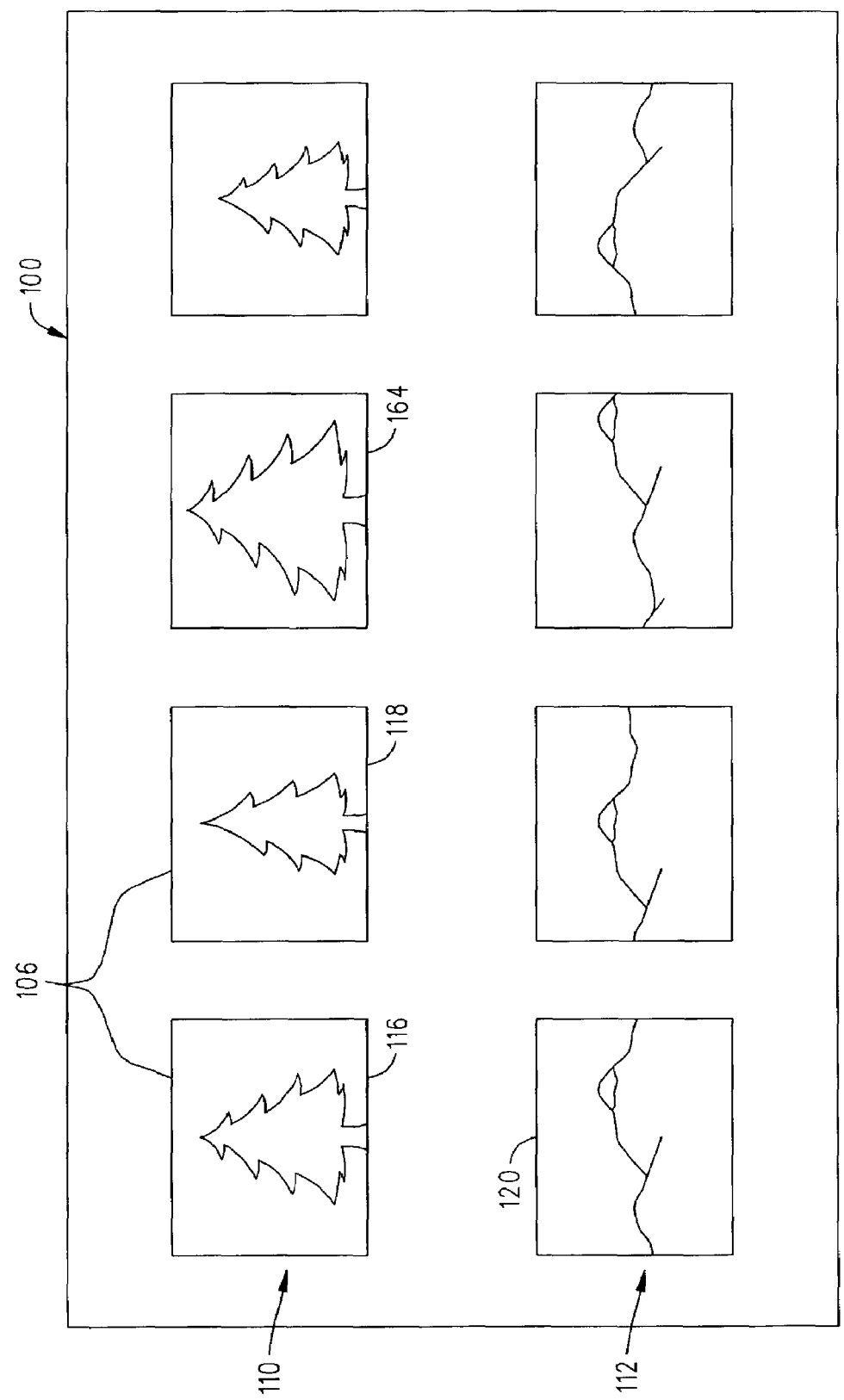
FIG. 1 is an embodiment of a viewing device displaying a plurality of images.

Referring to FIG. 1, one embodiment of the aforementioned methods and devices may use a viewing device 100 to display a plurality of images 106. The viewing device 100 may be connected to a computer, not shown, that runs a program as briefly described above. It should be noted that the arrangement of the images 106 as shown in FIG. 1 is achieved after the image data is analyzed as described below. The images 106 are arranged into a first plurality of images 110 and a second plurality of images 112. As described in greater detail below, the images in the first plurality of images 110 are all similar to one another. Likewise, the images in the second plurality of images 112 are also similar to one another. The first plurality of images 110 includes a first image 116 and a second image 118 that are described in greater detail below. The second plurality of images 112 includes a third image 120 that is also described in greater detail below. It should be noted that more than two pluralities of similar images may be displayed on the viewing device 100. It should also be reiterated that the plurality of images 106 as sorted in FIG. 1 is an example of the sorting after the image data has been analyzed as described below.

The image data corresponding to the plurality of images 106 may be generated by an imaging device. For example, a user of a digital camera may capture a plurality of images, which are converted to image data by the digital camera. The image data may be transferred and/or copied to a data storage device within the computer. The computer program running on the computer may then analyze the image data to sort the images into groups of similar images as described herein. The computer may also cause the images to be displayed on the display device 100 as described above.

Figure 2:
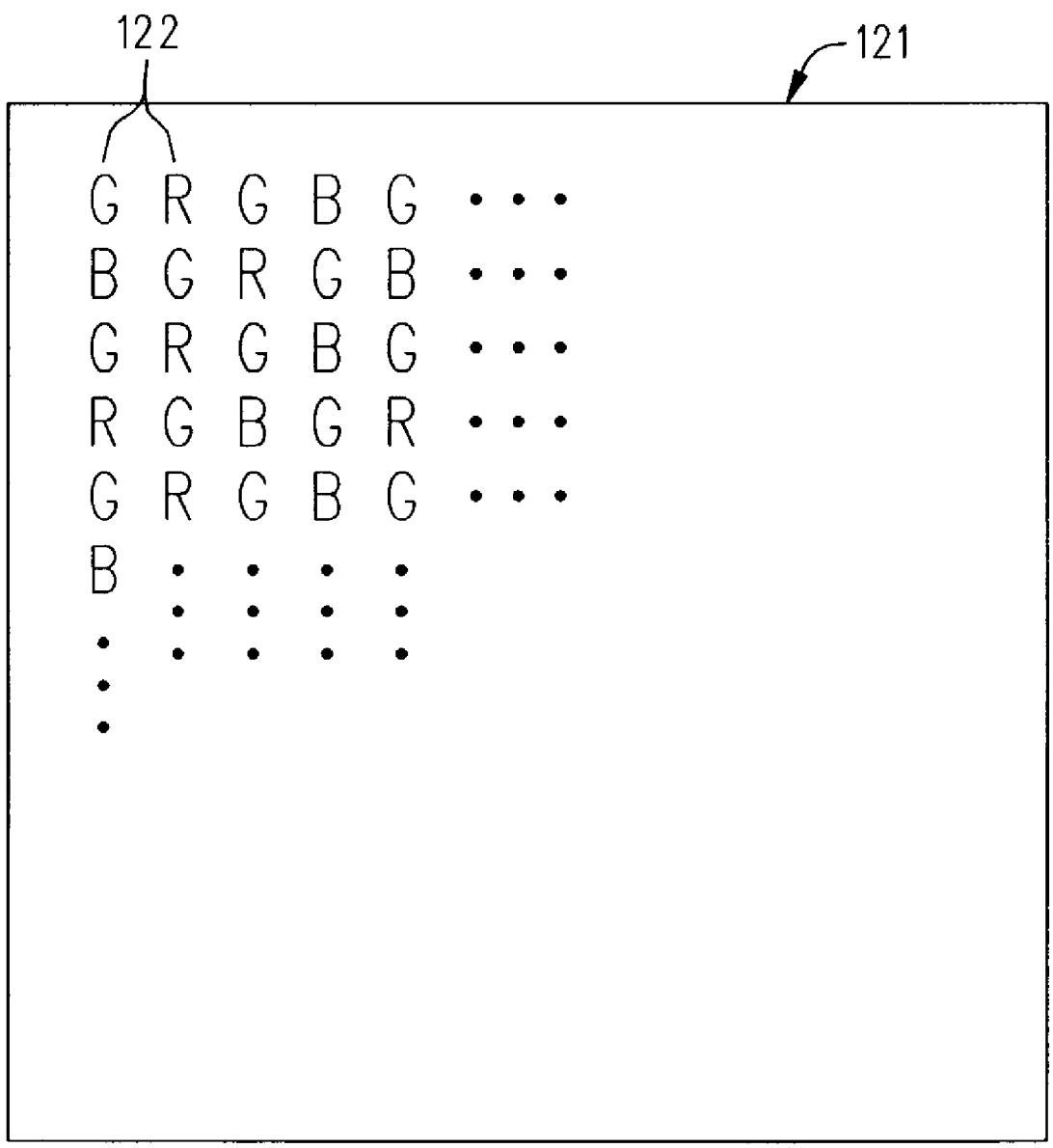
FIG. 2 is an enlarged and partial view of a two-dimensional photosensor array with a color filter associated therewith.

Digital cameras use two-dimensional photosensor arrays to convert light reflected from an object to image data representative of the image of the object. One example of a two-dimensional photosensor array 121 is shown in FIG. 2. It should be noted that the photosensor array 121 of FIG. 2 is, for illustration purposes, a partial and greatly enlarged illustration of a photosensor array. The photosensor array 121 has a plurality of photodetectors 122 that generate image data corresponding to the amount of light they receive. Accordingly, the image data representative of an image consists of a plurality of image data values that correspond to the amount of light reflected from discrete portions of the object being imaged. The image data values are sometimes simply referred to as data values. During replication of the image of the object, an algorithm, such as a demosaicing algorithm, is applied to the image data in order to transform the image data values to the image.

When the imaging device is used to generate image data representative of a color image, the photosensor array 121 typically has a color filter located adjacent the photodetectors. One embodiment of a color filter is a filter that uses a Bayer pattern as shown with the photosensor array 121 of FIG. 2. The color filter allows only certain color components of the light reflected from the object to pass to specific photodetectors 122. Accordingly, specific photodetectors 122 generate image data representative of specific colors of light. In the Bayer pattern of FIG. 2, the color components that are imaged by the photodetectors 122 are red, green, and blue as represented by the letters R, G, and B respectively.

As described above, the photodetectors 122 generate image data values representative of the amount of light they receive. The data values may ultimately be converted to numbers, such as binary number representative of the amount of light received by the photodetectors 122. When a color filter as shown in FIG. 2 is used in conjunction with a photosensor array 121, the photodetectors generate image data representative of the amount of a specific color of light they receive. For example, photodetectors that have green filters associated with them may cause high data values to be generated when they receive bright green light and low data numbers to be generated when they receive little or dim green light. Thus, the image data representative of a color image consists of a plurality of data values that are representative of the intensity and colors of light reflected from an object.

Referring again to FIG. 1, having described the image data, the images 106 and methods for sorting the images 106 will be described in greater detail. The images 106 in the first plurality of images 110 are, for reasons of simple illustrations, different views of a single tree or images of different trees. The images in the second plurality of images 112 are, for reasons of simple illustrations, different view of similar landscape. The images 106 have been replicated by the viewing device 100 based on image data representative of the images 106. Accordingly, the image data representative of the images 106 consists of a plurality of data values that will be analyzed as described in greater detail below.

As described above, the similar images have been sorted to generate the first plurality of images 110 and the second plurality of images 112, which are both displayed on the viewing device 100. A user may use a keyboard or other input or communication device to cause specific images to be highlighted or otherwise selected. For example, highlighted images may appear with a different border than other images. The user may then choose to retain or delete a highlighted image. Image data of retained images may be saved in a location selected by the user. Image data of deleted images may be erased.

In one embodiment, the imaging device is electrically or otherwise operatively connected to a computer as described above. In such an embodiment, the image data may remain in memory in the imaging device and image data representing images that are to be deleted may be deleted from the memory in the imaging device. For example, the computer may send instructions to the imaging device that cause the imaging device to delete the respective image data. In another embodiment, the image data is transferred from the imaging device to memory within the computer. The image data that is to be erased may be erased from the memory within the computer.

Having described a process of displaying the images 106 on the viewing device 100 and deleting image data, an embodiment of sorting the images 106 will now be described. It should be noted that the images 106 typically depict an object, such as a tree or a landscape as shown in FIG. 1. The process of sorting similar images may include sorting images that depict similar objects. In summary, image data representative of the same portions of different images is analyzed. If the image data is similar, the images, or the objects depicted by the images, are likely similar and are grouped as similar images. Other embodiments of sorting similar images include analyzing image data from several portions of different images. Yet other embodiments include analyzing the color components from portions of different images.

Figure 3:
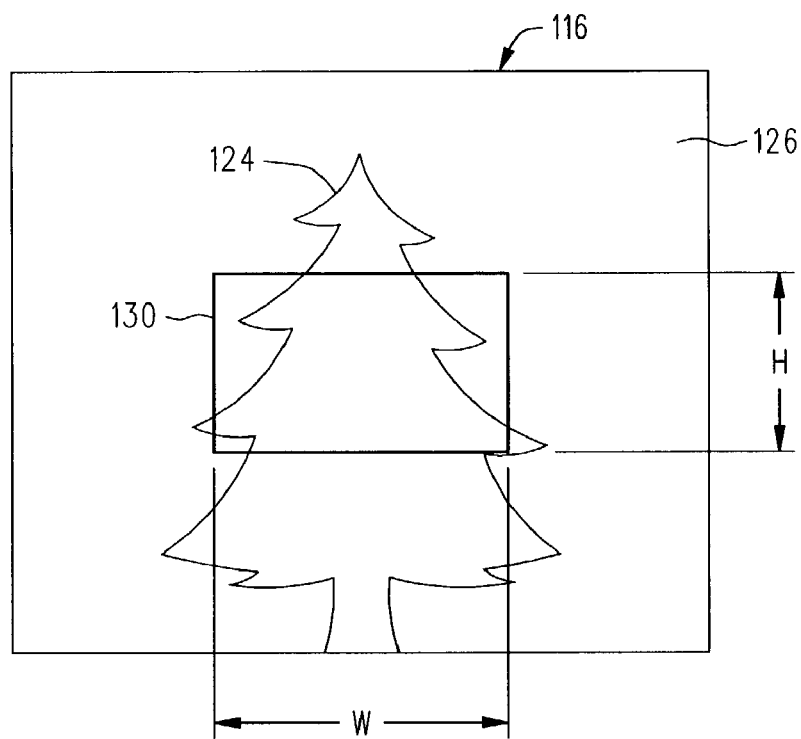
FIG. 3 is an enlarged view of the first image displayed on the viewing device of FIG. 1.
Figure 4:
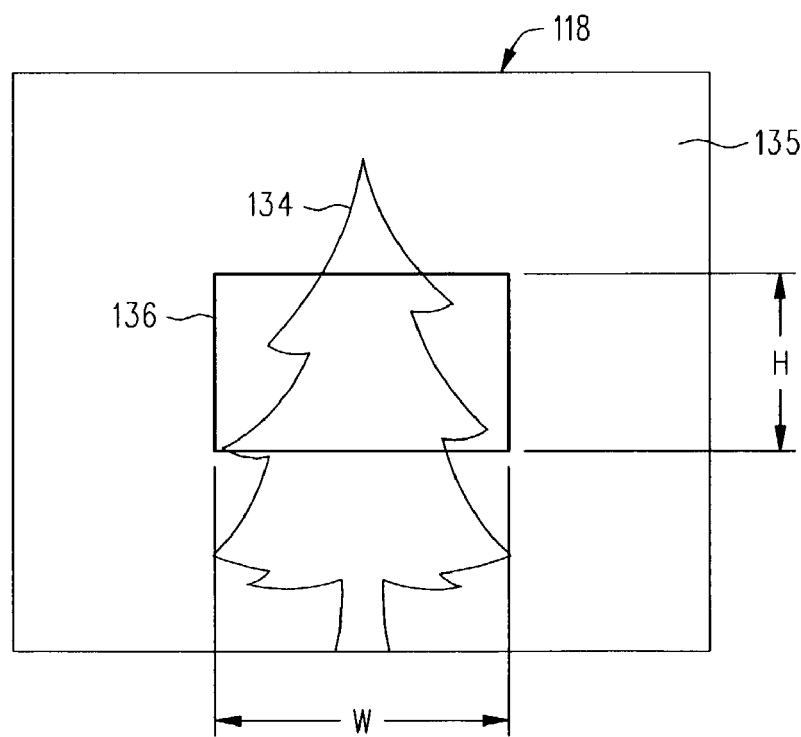
FIG. 4 is an enlarged view of the second image displayed on the viewing device of FIG. 1.
Figure 5:
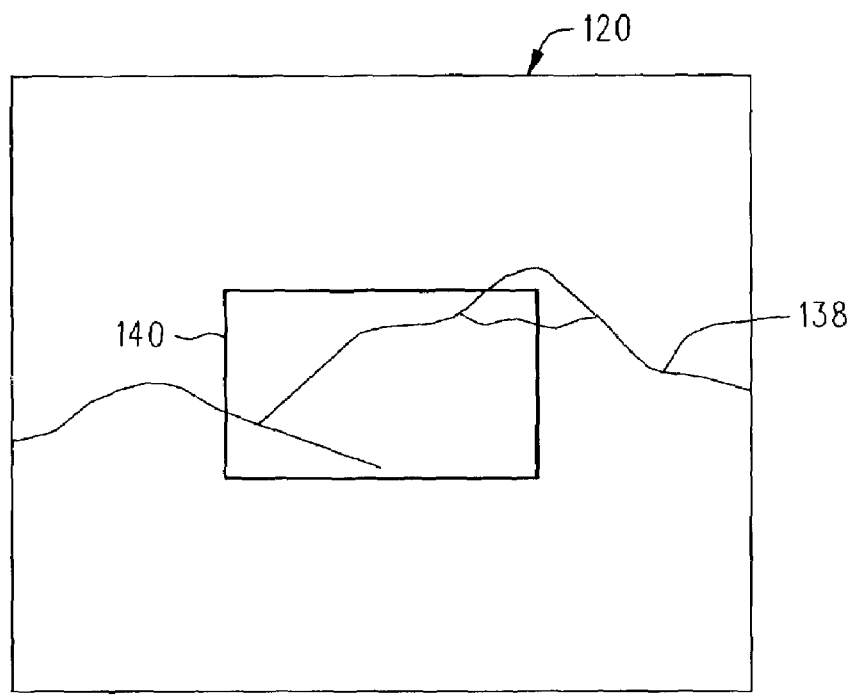
FIG. 5 is an enlarged view of the third image displayed on the viewing device of FIG. 1.

The processes of sorting similar images are described in greater detail with reference to FIGS. 3, 4 and 5. FIG. 3 is an enlarged view of the first image 116 of FIG. 1, FIG. 4 is an enlarged view of the second image 118 of FIG. 1, and FIG. 5 is an enlarged view of the third image 120 of FIG. 1. The first, second, and third images 116, 118, and 120 will be analyzed and compared to one another to determine whether they are similar. It should be noted that the sorted images as shown in FIG. 1 are the result of the sorting embodiments described herein. It should also be noted that while reference is made to analyzing the images, in reality, the image data from which the images are generated is actually analyzed. It should also be noted that analyzing an object typically includes analyzing the image containing the object. Accordingly, sorting similar images typically embodies sorting the images by sorting similar objects which are the subjects of the images.

As shown in FIG. 3, the first image 116 is primarily of a first object 124 and first background 126. In the non-limiting example of FIG. 3, the first object 124 is a tree and the first background is featureless. In many embodiments, the background has features, however, these features are typically not significant in many embodiments of the analysis described herein because the object is typically centered in the image. More specifically, in many embodiments, the analysis is focused on the centers of the images where the objects are typically located. Therefore, the backgrounds are typically irrelevant.

In one embodiment, a first portion 130 of the first image 116 may be analyzed. More specifically, image data representative of the first portion 130 of the first image 116 may be analyzed. The first portion 130 may be substantially centered in the first image 116. Because the subject of an image is typically centered in the image, the subject typically constitutes a substantial portion of the first portion 130. Therefore, the first object 124 constitutes a substantial portion of the first portion 130. The first portion 130 may have a height H and a width W. The ratio of the height H and the width W may correspond to the aspect ratio of the first image 116. The area of the first portion 130 may, in one non-limiting example, be approximately one ninth of the area of the first image 116.

The values of the image data representative of first portion may be sampled in order to determine some of the features regarding the portion of the first object 124 that are located in the first portion 130. The values of the image data representative of the first portion 130 are sometimes referred to as the first pixel values. The sampled values of the image data representative of the first portion 130 may also be referred to as the first pixel values.

In one non-limiting embodiment, all the values of the image data representative of the first portion 130 are averaged in order to sample the values of the image data representative of the first portion 130. As described above, values of the image data are representative of the intensity of light reflected from the object being imaged. For example, high values of image data are typically representative of more light being reflected from the imaged object than low values of image data. Therefore, sampling the image data values representative of the first portion 130 provides an indication as to the average brightness or luminance of the imaged object in the area of the first portion 130. The value of the sampled image data is stored for further analysis. Other embodiments of sampling the image data values of the first portion 130 will be described in greater detail below.

With additional reference to FIG. 4, the second image 118 consists of a second object 134 located on a background 135. As shown, the second object 134 may be the similar to the first object 124, FIG. 3, however, some characteristics of the images do differ. For example, the image of the second object 134 may have been captured at a different angle and under different light conditions than the first object 124. As with the first image 116, image data representative of a first portion 136 of the second image 118 may be analyzed. The first portion 134 of the second image 118 is located in substantially the same location as the first portion 130 of the first image 116 in order to accurately compare the first image 116 to the second image 118.

Image data representative of the first portion 136 of the second image 118 may be sampled in the same manner as image data representative of the first portion 130 of the first image 116. The image data representative of the first portion 136 is sometimes referred to as the second pixel values. In some embodiments, the sampled image data representative of the first portion 136 is also referred to as the second pixel values. The value of the sampled image data may be stored for further analysis, which may include comparison to the value of the sampled the image data from the first portion 130 of the first image 116. As described in greater detail below, if the first image 116 is substantially similar to the second image 118, then the sampled image data of the first portion 130 will be substantially similar to the sampled image data of the first portion 136.

The sampled image data from the first portion 130 of the first image 116 is compared to the sampled image data from the first portion 136 of the second image 118. If the value of the sampled image data from the first portion 130 of the first image 116 is within a preselected value of the value of the sampled image data from the first portion 136 of the second image 118, then a determination is made that the first image 116 is substantially similar to the second image 118. Likewise, if the value of the sampled image data of the first portion 130 of the first image 116 is not within a preselected value of the value of the sampled image data of the first portion 136 of the second image 118, then a determination is made that the first image 116 is not substantially similar to the second image 118. It should be noted that the sampled image data from the first portion 130 of the first image 116 will likely differ slightly from the sampled image data values from the first portion 136 of the second image 118 even if the first object 124 is the same as the second object 134. The differences may be due to a number of factors, such as the images of the first object 124 and the second object 134 being captured under different light conditions or from different vantage points.

If the determination is made that the first image 116 is substantially similar to the second image 134, the determination may be noted by way of reference data or the like that may be stored in the computer or attached to the image data. In one embodiment, data is added to the image data in order to reference the similar images, so that the similar images may be grouped together. In another embodiment, a database associated with the computer is created that groups or otherwise sorts image data representative of similar images. Referring again to FIG. 1, the database may be accessed in order to sort and display similar images on the viewing device 100.for example, the database may indicate that the first image 116 is similar to the second image 118. Thus, the first image 116 may be displayed in the proximity of, or next to, the second image 118 as shown.

As shown in FIG. 1 and as described above, reference is made to a third image 120. An enlarged view of the third image is shown in FIG. 5. For purposes of this description, the third image 120 is substantially different than both the first image 116 and the second image 118. More specifically, the third image 120 is primarily an image of a third object 138, which is substantially different than either the first object 124, FIG. 3, or the third object 134, FIG. 4. A first portion 140 of the third image 120 is sampled in the same manner as the first portions 130 and 136 of FIGS. 3 and 4 respectively. Because the third object 138 differs substantially from the first object 124 and the second object 134, the value of the sampled image data from the first portion 140 of the third image will likely differ substantially from the values of the sampled image data from both the first portion 130 of the first image 116 and the first portion 136 of the second image 118. The difference in sampled image data will cause the computer or other processing device to determine that the third image 120 is not similar to either the first image 116 or the second image 118. Therefore, during the sorting process, the third image 120 will not be located in the group including the first image 116 and the second image 118.

Referring again to FIG. 1 and as briefly described above, similar images may be sorted and displayed proximate one another. In the example of FIG. 1, the first plurality of images 110 contains images that are similar to the first image 116 and the second image 118. Likewise, the second plurality of images 112 contains images that are similar to the third image 120. A user may then select which of the similar images are to be saved and which ones are to be deleted. For example, a user may select an image, which may cause a border, not shown, surrounding the image to be distinct relative to borders of the images that are not selected. Actions by the user may then determine whether the images are to be saved or deleted. For example, pressing a delete key on a keyboard associated with the viewing device 100 may cause the image data corresponding to the selected image to be deleted.

Having described some embodiments of the devices and methods, other embodiments will now be described.

In one embodiment, the light intensities of different color components of the first portions are compared to each other in order to make a more accurate determination as to whether the images are similar to one another. This embodiment analyzes more data than the embodiments described above and, thus, may yield a more accurate result as to whether the images are similar or not. With reference to the above-described images and referring to FIGS. 3, 4, and 5, the intensities of the color components of the first portions 130, 136, 140 may be compared to one another. For example, the image data representative of the intensities of light received by the green photodetectors may be sampled from each of the first portions 130, 136, 140. In a similar manner, the image data representative of the intensities of light received by red photodetectors and the blue photodetectors may be sampled for each of the first portions 130, 136, 140. If the intensities of the color components of the first portions 130, 136, 140 are within a preselected value of one another, it may be determined that the images are similar.

In a similar embodiment, the ratios of the color intensities may be compared to one another. For example, the ratios of sampled image data generated by the red, green, and blue photodetectors representative of the first portions 130, 136, and 156 may be compared to one another. If the ratios are within a preselected amount or amounts, the images may be determined to be similar. Therefore, if one image is captured under bright light conditions and another similar image is captured under low light conditions, the intensities of the color components will likely be different. However, they may have the same ratios of the color components and may be properly considered to be similar images.

In another embodiment, the images may be considered to be similar if some of the intensities of the color components are within preselected amounts of each other between different images. For example, if the intensities of two of three color components are within a first preselected value of one another and the intensities of the third color component are within a second preselected value of one another, the images may be considered to be similar. This embodiment enables the detection of similar images when the intensity of one of the color components has varied. For example, a difference in lighting conditions may affect color components between images of the same object. This embodiment overcomes the change in color components so long as the change is within the a preselected amount.

Other embodiments of sampling the image data will now be described. In one embodiment, several portions of an image are sampled, which provides more data to analyze. The more data, in turn, provides a more accurate determination as to whether the images are similar. One example of this embodiment is shown by an image 144 in FIG. 6. Image data representative of a portion 146 of the image is analyzed. The portion 146 is made of a plurality of individual tiles 148. The image data representative of each of the tiles 148 is sampled. In the non-limiting embodiment of FIG. 7, the portion 146 is made of sixteen tiles 148. Therefore, each image has sixteen sampled values that may be compared in order to determine whether the images are similar. It should be noted that the whole image may be divided into a plurality of tiles that may be sampled as described above.

The sampled image data is compared to corresponding sampled image data of other images. If the sampled image data are within preselected values of one another, the images are determined to be similar and are processed as described above and as shown in FIG. 1. Several different techniques may be employed to compare the sampled image data. In one embodiment, the sampled image data representative of each tile of a first image must be within a preselected value of each corresponding tile of a second image in order for the two images to be determined to be similar. In another embodiment, a preselected number of image data samples of tiles of a first image must be within a preselected value of image data samples of tiles of a second image.

Figure 7:
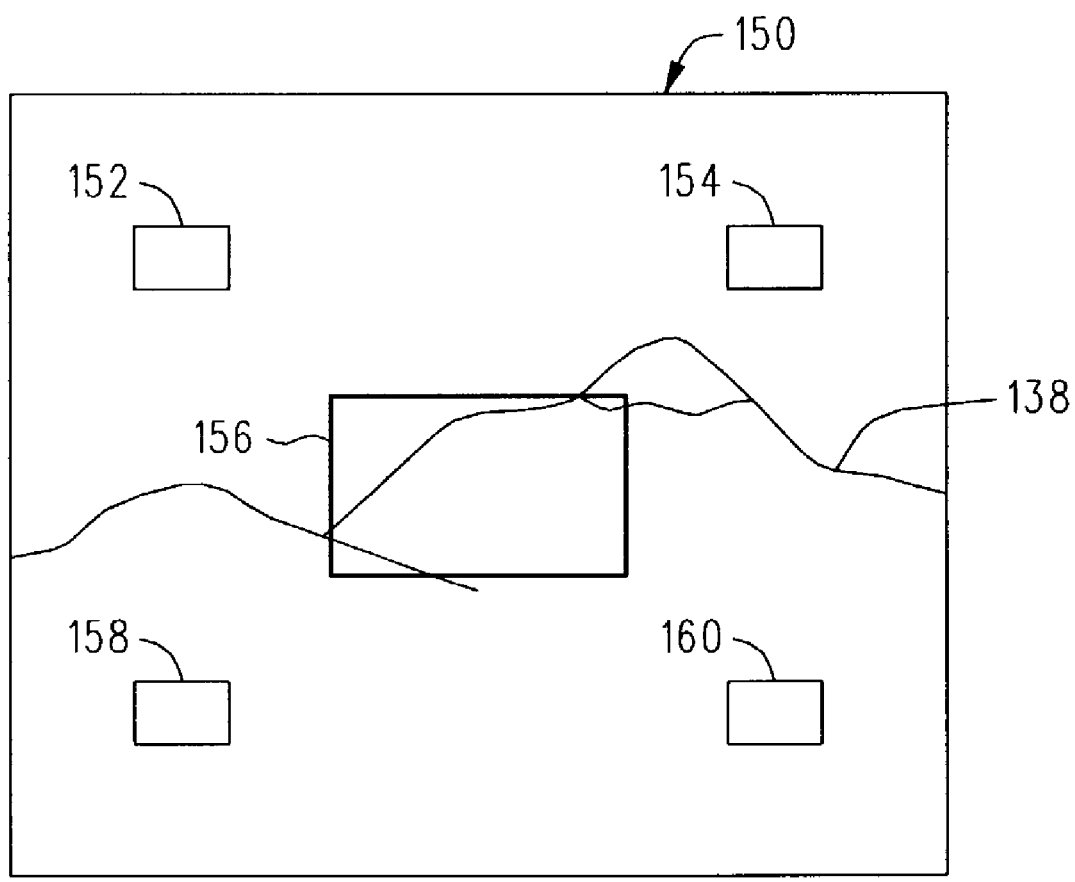
FIG. 7 is an example of a sampling procedure to sample image data representative of an image.

Another sampling technique is shown in FIG. 7. In this embodiment, several portions of different images may be sampled, which may provide a different analysis as to whether images are similar. Therefore, if an object is moved relative to its background between different images, the images may still be determined to be similar. In addition, the sampling of various portions of an image may also provide additional data as to the similarities of the images by comparing the backgrounds of the images to one another.

Figure 6:
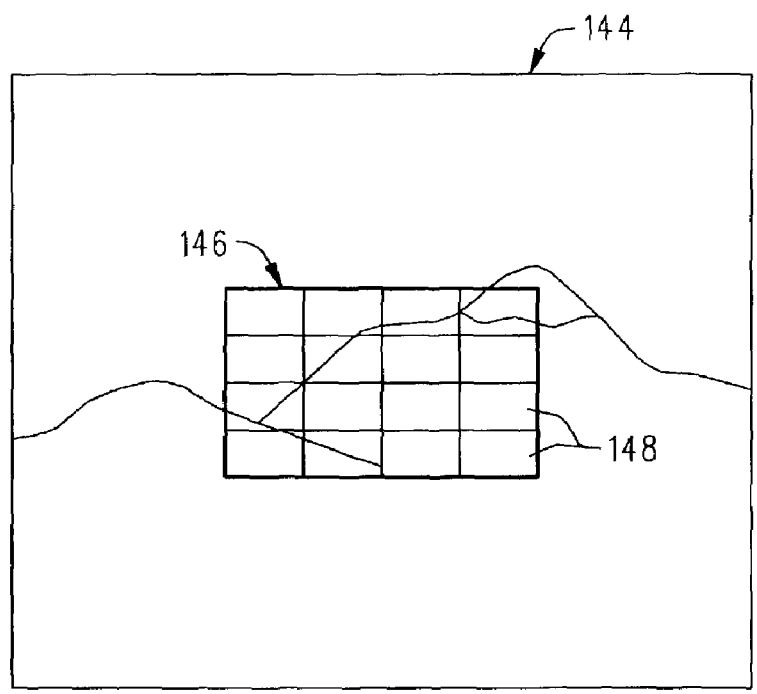
FIG. 6 is an example of a sampling procedure to sample image data representative of an image.

An image 150 of FIG. 7 provides an example of sampling five different portions of an image. The portions are individually referred to as the first portion 152, the second portion 154, the third portion 156, the fourth portion 158, and the fifth portion 160. The third portion 156 samples image data representative of the center of the image 150. The first portion 152, the second portion 154, the fourth portion 158, and the fifth portion 160 sample image data more proximate the corners of the image 150 than the third portion 156. The portions of the images may be sampled and compared to one another as described above to determine if the images are similar. For example, the color components of the different portions may be compared to one another. In another example, the different portions may be divided into a plurality of tiles as shown in FIG. 6.

One other embodiment of sampling and processing the image data involves the user selecting the best sampling and/or comparison technique for a plurality of images. The sampling techniques described above provide for different levels of sampling, which cause different sensitivities in the determination as to whether images are similar. For example, a situation wherein image data representative of one portion of an image is sampled solely for luminance or intensity may erroneously determine that many different images are similar. On the other hand, a situation that samples many different portions of an image and requires that the sampled image data from these portions be almost identical may not accurately determine that similar images are in fact similar. For example, this situation may determine that similar images vary enough to cause them to be located in different groups as shown by the first and second plurality of images 110, 112 of FIG. 1.

Therefore, one embodiment of sampling involves the user selecting the sensitivity applied to the determination of whether images are similar. For example, if the viewing device 100 displays a group of images that are not similar, the user may increase the sensitivity of the determination. This may be accomplished by decreasing the aforementioned preselected amounts between the sampled image data that are required for images to be determined to be similar. Another way to accomplish this is by increasing the amount of data analyzed by the computer. As described above, the amount of data analyzed by the computer may be increased by analyzing the color components of the images and different portions of the images.

If, on the other hand, the viewing device 100 displays too many pluralities of images, the sensitivity of the determination may be decreased. For example, if the viewing device 100 displays several different pluralities of images and the different pluralities are of the same image, the sensitivity may be lowered. This may be accomplished by increasing the aforementioned preselected amounts between sampled image data that is required for images to be determined to be similar. Another way to accomplish this is by decreasing the amount of data analyzed by the computer. For example fewer portions of the image may be analyzed or the color components of different portions of the image may not be analyzed or the analysis criteria may be lowered.

Referring to FIG. 1, another embodiment for displaying the images 106 may display images that are the most similar to one another in the closest proximity to one another. For example, a first image may be determined to be similar to a second image that, in turn, may be determined to be similar to a third image. However, the first image may not be determined to be similar to the third image. In such a situation, the first image may be displayed adjacent the second image and opposite the third image. In order to illustrate this embodiment, reference is made to a fourth image 164 in FIG. 1. The first image 116 and the fourth image 164 may both be determined to be similar to the second image 118. However, the first image 116 may not be determined to be similar to the fourth image 164. Therefore, the images are displayed as shown in FIG. 1 wherein the first image 116 and the fourth image 164 are next to the second image 118. However, the first image 116 is opposite the fourth image 164.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of comparing images, said images being represented by image data comprising a plurality of image data values, said method comprising:
   determining at least one image data value representative of at least one first portion of a first image;
   determining at least one second image data value representative of at least one first portion of a second image, said at least one first portion of said first image and said at least one first portion of said second image being located in substantially similar regions of said first image and said second image; and
   comparing said at least one first image data value to said at least one second image data value;
   wherein said first image is similar to said second image if said at least one first image data value is within a preselected amount of said at least one second image data value.

2. The method of claim 1, wherein said comparing comprises:
   sampling said at least one first image data value representative of said at least one first portion of said first image;
   sampling said at least one second image data value representative of said at least one first portion of said at least one second image; and
   comparing the sampled at least one image data value representative of said at least one first portion of said first image to the sampled at least at least one image data value representative of said at least one first portion of said second image; and
   wherein said first image is similar to said second image if said sampled at least one image data value representative of said at least one first portion of said first image is within a preselected amount of said sampled at least at least one image data value representative of said at least one first portion of said second image.

3. The method of claim 2, wherein said sampling comprises averaging said image data values.

4. The method of claim 1, and further comprising displaying said first image proximate said second image if said first image is similar to said second image.

5. The method of claim 1, and further comprising:
   determining at least one third image data value representative of at least one first portion of a third image, said at least one first portion of said first image and said at least one first portion of said third image being located in substantially similar regions of said first image and said third image;
   comparing said at least one first image data value to said at least one third image data value; and
   wherein said first image is similar to said at least one third image if said at least one first image data value is within a preselected amount of said at least one third image data value.

6. The method of claim 5, and further comprising:
   comparing said at least one second image data value to said at least one third image data value; and
   wherein said second image is similar to said at least one third image if said at least one second image data value is within a preselected amount of said at least one third image data value.

7. The method of claim 6, and further comprising displaying images proximate one another that are similar to one another.

8. The method of claim 1, and further comprising receiving data that places at least one of said images in either a first or a second operative condition; saving image data representative of images in said first operative condition; and deleting image data representative of images in said second operative condition.

9. The method of claim 1:
   wherein said image data values represent at least one color component of an image;
   wherein said determining at least one first data value comprises determining at least one first image data value representative of at least one first portion and at least one color component of a first image; and
   wherein said determining at least one second image data value comprises determining at least one second image data value representative of a first portion and said at least one color component of a second image, said first portion of said first image being located in substantially the same region as said first portion of said second image.

10. A method of comparing images, said images being represented by image data comprising a plurality of image data values, said method comprising:
    determining first image data values representative of a plurality of portions of a first image;
    determining second image data values representative of a plurality of portions of a second image, said plurality of portions of said first image and said plurality of portions of said second image being located in substantially similar regions of said first image and said second image; and comparing said first image data values to said second image data values;
wherein said first image is similar to said second image if said first image data values are within a preselected amount of a preselected number of said second image data values.

11. The method of claim 10, wherein said comparing comprises:
sampling said first image data values;
sampling said second image data values; and
comparing the first sampled image data values to the second sampled image data values;
wherein said first image is similar to said second image if said first sampled pixel values are within a preselected amount of said second sampled pixel values.

12. The method of claim 11, wherein said sampling comprises averaging said image data values.

13. The method of claim 10, wherein at least one of said first image data values and at least one of second image data values correspond to at least one color component of said first image and said second image.

14. The method of claim 10:
wherein at least one of said image data values represent at least one color component of said first image and said second image;
wherein said determining first image data values comprises determining first image data values representative of at least one color component of a plurality of portions of a first image; and
wherein said determining second image data values comprises determining second image data values representative of said at least one color component of a plurality of portions of a second image, said pluralities of portions of said first image being located in substantially the same regions as said pluralities of portions of said second image.

15. The method of claim 10, wherein said first image is similar to said second image if a preselected number of said first image data values representative of portions of said first image are within a preselected amount of a preselected number of said second image data values representative of said second image.

16. The method of claim 10, and further comprising:
sampling said first image data values representative of each of said plurality of portions of said first image;
sampling said second image data values representative of each of said plurality of portions of said second image;
wherein said first image is similar to said second image if a preselected number of sampled image data values representative of portions of said first image are within a preselected amount of a preselected number of sampled image data values representative of portions of said second image.

17. The method of claim 10, and further comprising displaying said first image proximate said second image if said first image is similar to said second image.

18. The method of claim 10, and further comprising:
determining third image data values representative of a plurality of portions of at least one third image, said plurality of portions of said at least one third image being located in a substantially similar regions of said at least one third image as said plurality of portions of said first image;
wherein said comparing comprises comparing said first image data values to said third image data values to one another; and
wherein said first image is similar to said at least one third image if said first image data values are within a preselected amount of a preselected number of said third image data values.

19. The method of claim 10, and further comprising displaying images proximate one another that are similar to one another.

20. The method of claim 10, and further comprising receiving data that places at least one of said images in either a first or a second operative condition; saving image data representative of images in said first operative condition; and deleting image data representative of images in said second operative condition.

21. A device for comparing images, said images being represented by image data comprising a plurality of image data values, said device comprising:
a computer comprising a computer readable medium, said computer readable medium comprising instructions for:
determining at least one first image data value representative of a first portion of a first image;
determining at least one second image data value representative of a first portion of a second image, said first portion of said first image and said first portion of said second image being located in substantially similar regions of said first image and said second image; and
comparing said at least one first image value to said at least one second image data value;
wherein said first image is similar to said second image if said at least one first image data value is within a preselected amount of said at least one second image data value.

22. The device of claim 21, wherein said instructions further comprise:
sampling said at least one first image data value; and
sampling said at least one second image data value;
wherein said comparing comprises comparing the at least one first sampled image data value to the at least one second sampled image data value; and
wherein said first image is similar to said second image if said at least one first sampled image data value is within a preselected amount of said at least one second sampled image data value.

23. The device of claim 22, wherein said sampling comprises averaging said image data values.

24. The device of claim 21, wherein said instructions further comprise displaying said first image proximate said second image if said first image is similar to said second image.

25. The device of claim 21, wherein said instructions further comprise:
determining at least one third image data value representative of a first portion of at least one third image, said first portion of said at least one third image being located in a substantially similar region of said at least one third image as said first portion of said first image;
wherein said comparing comprises comparing said at least one first image data value to said at least one third image data value;
wherein said first image is similar to at least one third image if said at least one first image data value is within a preselected amount of said at least one third image data value; and
wherein said second image is similar to said at least one third image if said at least one second image data value is within a preselected amount of said at least one third image data value.

26. The device of claim 21, wherein said instructions further comprise receiving data that places at least one of said images in either a first or a second operative condition; saving image data representative of images in said first operative condition; and deleting image data representative of images in said second operative condition.

27. The device of claim 22:
wherein said image data values represent at least one color component of an image;
wherein said determining at least one first image data value comprises determining at least one first image data value representative of a first portion and at least one color component of a first image; and
wherein said determining at least one second image data value comprises determining at least one second image data value representative of a first portion and said at least one color component of a second image, said first portion of said first image being located in substantially the same region as said first portion of said second image.

28. A device for comparing images, said images being represented by image data comprising a plurality of image data values, said method comprising:
first determining means for determining at least one first image data value representative of a first portion of a first image;
second determining means for determining at least one second image data value representative of a first portion of a second image, said first portion of said first image and said first portion of said second image being located in substantially similar regions of said first image and said second image; and
comparing means for comparing said at least one first image data value to said at least one second image data value;
wherein said first image is similar to said second image if said at least one first image data value is within a preselected amount of said at least one second image data value.

29. The device of claim 28 wherein said comparing means comprises:
means for sampling said at least one first image data value;
means for sampling said at least one second image data value; and
means for comparing the at least one first sampled image data value to the at least one second sampled image data; and
wherein said first image is similar to said second image if said at least one first sampled image data value is within a preselected amount of said at least one second sampled image data value.

30. The device of claim 28, and further comprising display means for displaying said first image proximate said second image if said first image is similar to said second image.

31. The device of claim 28, and further comprising receiving means for receiving data and placing at least one of said images in either a first or a second operative condition; saving image data representative of images in said first operative condition; and deleting image data representative of images in said second operative condition.

\* \* \* \* \*

UNITED STATES PATENT AND TRADEMARK OFFICE
CERTIFICATE OF CORRECTION

PATENT NO. : 7,450,785 B2 Page 1 of 1
APPLICATION NO. : 10/349691
DATED : November 11, 2008
INVENTOR(S) : William R. Haas et al.

It is certified that error appears in the above-identified patent and that said Letters Patent is hereby corrected as shown below:

In column 10, line 1, in Claim 2, after "sampled at least" delete "at least".

In column 10, lines 7–8, in Claim 2, after "sampled at least" delete "at least".

Signed and Sealed this

Nineteenth Day of May, 2009

JOHN DOLL
*Acting Director of the United States Patent and Trademark Office*